Feb. 16, 1937.　　　M. K. AKERS　　　2,071,014

GAME

Filed Dec. 16, 1933

INVENTOR
Milton K. Akers
BY
Maréchal & Noe
ATTORNEY

Patented Feb. 16, 1937

2,071,014

UNITED STATES PATENT OFFICE 2,071,014

GAME

Milton K. Akers, Troy, Ohio, assignor to John T. Patterson, Dayton, Ohio

Application December 16, 1933, Serial No. 702,747

3 Claims. (Cl. 273—131)

This invention relates to games.

One object of the invention is to provide an educational and amusing game comprising a plurality of game pieces having series of sequential indications and a number of other game pieces some in duplication respectively of certain predetermined sequential indication pieces of the respective series and others in duplication in common of any of the sequential indications of certain of said series, and still others each of variable value in a plurality of series and sequences whereby words or other collocations of sequential indications may be evolved.

Another object of the invention is the provision of a game of the character mentioned in which letter pieces are identified or arranged in four different suits, each piece having a suit identifying symbol and also bearing a letter of the alphabet so that each suit sequentially constitutes a complete alphabet, a predetermined number of additional pieces being provided for extra vowels in certain suits, and further additional pieces being marked for use with certain different suits but of variable letter value.

Other objects and advantages of the invention will be apparent from the following description, the appended claims and the accompanying drawing in which,—

Figure 1:
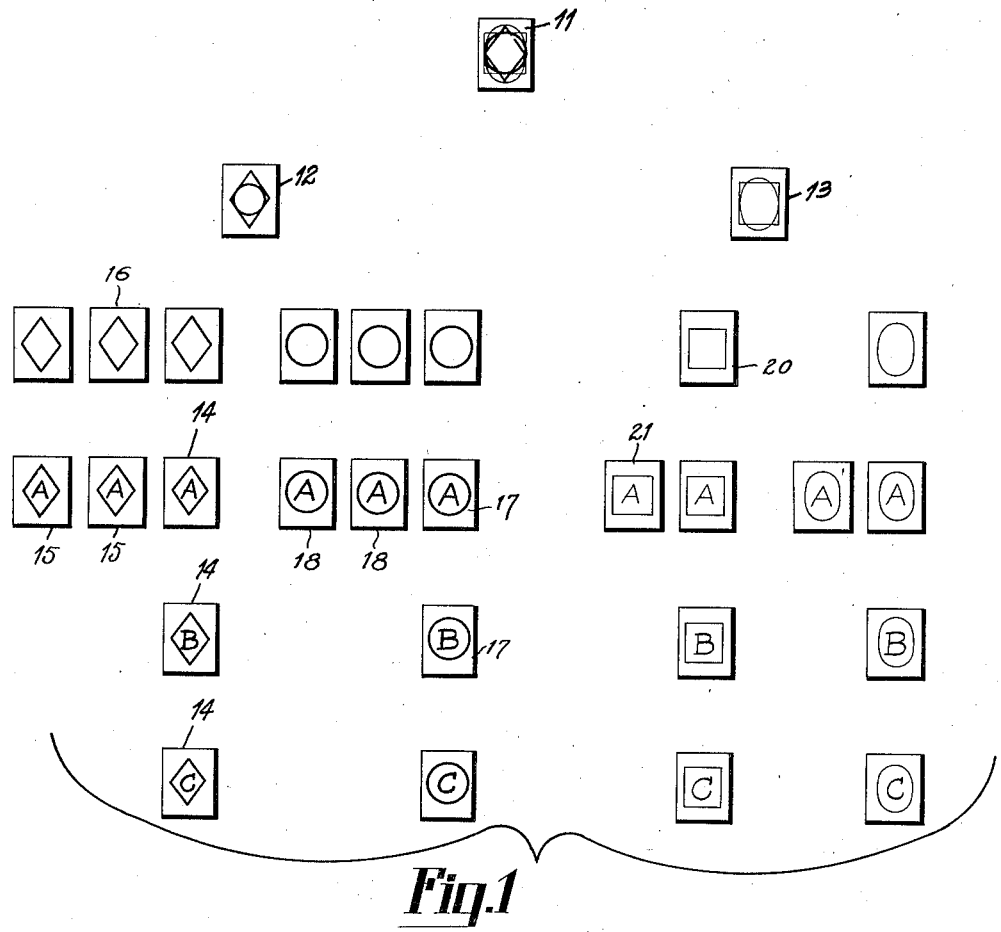
Figure 2:
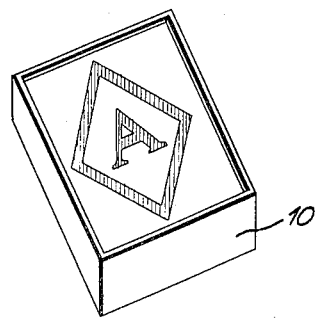

Fig. 1 shows some of the playing pieces of the game embodying the present invention; and Fig. 2 is a perspective view of one of the pieces.

In accordance with the present invention, as shown in the drawing to which reference is made by reference numerals, the game comprises a set of pieces which may be made in the form of cards or blocks, one of which is designated by the numeral 10 in Fig. 2. The pieces are arranged and marked in different series or suits, and certain of the pieces are provided with sequential indications such as alphabet letters so that each suit of lettered pieces constitutes a complete alphabet, although additional pieces bearing extra vowels are provided for certain of the suits.

There are preferably 145 pieces in the set, arranged as follows: One joker piece or tile 11 is provided, this piece being adapted to be used in conjunction with pieces of any of the four suits, and preferably having an identifying symbol for each suit but being devoid of letters. Two "clear" pieces 12 and 13 are provided each being devoid of letters, but each having suit identifying symbols common to two of the suits. Thus the piece 12 may be provided with symbols such as a diamond and a circle and these may both be marked in red, while the piece 13 may be provided with a square and with an ellipse, in black. In addition to the pieces 11, 12 and 13 there are letter pieces or blocks each having a single suit identifying character or symbol, as follows. In the diamond suit for example there are twenty-six letter or alphabet pieces as indicated at 14, all having the same suit identifying symbol such as the diamond or other suitable geometric figure, and each of these pieces 14 is provided with a different letter so that these twenty-six pieces collectively constitute a complete alphabet. The suit identifying symbol and the letter are marked in red, in contrast with the background. In addition to the twenty-six alphabet pieces 14 of the diamond suit there are two additional vowel pieces 15 for each of the five vowels, each of the pieces 15 having the suit identifying symbol, in this case a diamond character. Further, there are three extra or "clear" tiles 16 for the diamond suit each bearing the diamond symbol but having no alphabet letter thereon. All of the tiles of the diamond suit are preferably colored in the same way.

The other suits may be identified by such geometric characters as the circle, square and ellipse, the circle suit being marked in red in the same way as the diamond suit and having twenty-six letter pieces 17, two extra pieces 18 for each of the vowels, and three clear pieces 19. The pieces of the square and the ellipse suits may be marked in black by providing the suit identifying symbols in black instead of red so that these two suits contrast clearly in coloring from the diamond and the circle suits. Each of the two black suits includes only one extra "clear" block 20 in each suit and one extra vowel block 21 for each of the vowels, in addition to the twenty-six blocks of the twenty-six letters of the alphabet.

It will now be seen that for each of the four different suits there is a complete alphabet and also additional vowel pieces, there being two extra pieces for each vowel in each of the red suits, that is, the diamond and circle suits, and only one extra vowel piece for each vowel in each of the black suits, namely the square and ellipse suits. In addition there are the clear tiles devoid of lettering but having the suit identifying marking, and also the pieces 11, 12 and 13 that were first described. The latter three pieces are adapted for use with more than one suit.

The lettering provided on the pieces may be printed directly on them, or may be printed on a separate piece of paper or the like which is attached to one face of the block or piece as shown in Fig. 2.

There are a variety of games more or less similar to each other that may be played using the pieces of the present invention, all including the spelling of words by the players by combination of letters of the playing pieces composing his hand. The four sets of alphabets with the additional vowel pieces together with the joker and other pieces devoid of letters make it possible for the players to spell many words from a few of the pieces selected and constituting his playing "hand". The player can combine his pieces into words so that each word is made up from pieces in the same suit, the extra vowel pieces and "clear" pieces permitting this even though the entire number of pieces in the game is not very large. As there are more unlettered pieces and extra vowels in two of the suits, namely the diamond and circle suits, the spelling of words using pieces from those suits will be easier than in the other two suits and a correspondingly smaller score "count" or value is therefore assigned to words built up by a player from the red suits than from the black suits. Extra values are also given for words having a large number of letters.

It is preferred that the game be played as follows:—Each player selects thirteen pieces at random from the complete set turned face down on the table. The player whose turn it is draws one piece from those remaining and then exposes as many words of three letters or more as his hand can be made up into, then discarding an unused piece which may be left face up in front of him. For each letter in excess of three in a word, a player draws one piece, when that word is exposed. The next player does the same thing in turn, having the choice of picking up the piece last discarded by any player or one from those face down on the table. This continues until some one scores "game" by using up all of the pieces in his hand and exposes four words of three letters or more and a final word of two letters, with each word made up of pieces in one suit, although he can use the clear or common pieces or the joker to fill in any letter needed in the particular suits in which the unlettered pieces may be used. Suitable scores may be given for the spelling of long words, for having all the words exposed by a player made up from pieces of the same suit, or for special bonus words that may be decided upon before the game is played. Thus the winner scoring "game" counts or scores 100 for game in mixed suits, 150 for game all in red, 200 for game all in black and in addition each player including the one scoring game counts 10 for each exposed word of four letters in a red suit (diamonds and circles) and 20 for each word of four letters in a black suit and additional values for longer words, for special words such as "diamond", "square", "circle", "ellipse", and for words employing the joker.

The use of the pieces in spelling out words has an instructive and educational value, and is quite interesting and amusing, and with the arrangement of the pieces in different suits so that each suit has extra vowels and also extra unlettered pieces that may be used for any letters, it will be apparent that the variety of words that may be built up in any one suit is quite large as it includes words in which either consonants or vowels or both, are duplicated. This great flexibility and variety of words to which the game is adapted, however, is provided for in a set of pieces which is comparatively small in total number.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A game for use in evolving words comprising a plurality of game pieces arranged in a number of series, each piece having a series identifying character and a letter of the alphabet thereon with each series providing a complete alphabet, a number of other game pieces in duplication respectively of only certain vowels and each having a series identifying character, one of the series having a greater number of said duplication vowels than another series, other game pieces in certain of said series each having the series identifying character of its series but free of the alphabet character, and still other game pieces each having the series identifying character of a plurality of series but free from alphabet indicia.

2. A set of game pieces for use in evolving words by their collocation comprising a plurality of game pieces having series identifying characters of a plurality of series, with each series collectively marked to provide the letters of the alphabet, a number of other game pieces in duplication respectively of only certain special letters of the alphabet and having series identifying characters, other game pieces in certain of said series each having the series identifying character of its series but free from alphabet indicia, other game pieces each having a plurality of series identifying characters of certain of said series but free from alphabet indicia, and an additional piece having the series of identifying character of every one of the series but free from alphabet indicia.

3. A set of of game pieces comprising 134 letter pieces of four different suits, each letter piece having a suit identifying character and a letter of the alphabet, each suit of lettered pieces constituting a complete alphabet with two of the suits having two extra pieces for each vowel and the other two of the suits having one extra piece for each vowel, additional clear pieces devoid of alphabet letters but having suit identifying characters for each of the four different suits, and additional pieces devoid of letters and carrying a plurality of suit symbols.

MILTON K. AKERS.